United States Patent [19]

Raineri

[11] 4,444,208

[45] Apr. 24, 1984

[54] COMBINE HARVESTER

[75] Inventor: Giuseppe Raineri, Bassano del Grappa, Italy

[73] Assignee: Pietro Laverda S.p.A., Breganze, Italy

[21] Appl. No.: 394,989

[22] Filed: Jul. 2, 1982

[30] Foreign Application Priority Data

Aug. 28, 1981 [IT] Italy .............................. 53561/81[U]

[51] Int. Cl.³ ............................................. A01F 12/18
[52] U.S. Cl. ............................ 130/27 R; 130/27 HA; 130/27 F; 130/27 Q
[58] Field of Search ............ 56/14.6; 130/27 R, 27 F, 130/27 Q, 27 T, 27 AB, 24, 30 E, 27 HA, 27 K

[56] References Cited

U.S. PATENT DOCUMENTS

| | | | |
|---|---|---|---|
| 3,191,606 | 6/1965 | Suzue | 130/30 E |
| 3,430,633 | 3/1969 | Mark | 130/27 R |
| 3,623,302 | 11/1971 | Schmitt | 130/27 T |
| 4,117,849 | 10/1978 | Pakosh | 130/27 Q |
| 4,180,081 | 12/1979 | Shaver | 130/27 Q |

*Primary Examiner*—Gene Mancene
*Assistant Examiner*—David L. Tarnoff
*Attorney, Agent, or Firm*—Sughrue, Mion, Zinn, Macpeak and Seas

[57] ABSTRACT

A combine harvester includes a threshing unit, a pair of transverse contra-rotating distributor augers located downstream of the threshing unit with respect to the direction of flow of the product and arranged to receive the product leaving the threshing unit and discharge it downwardly for distribution over the entire width of the harvester an accelerator roller located below the two distributor augers for accelerating the fall of the product, a substantially vertical fixed wall adjacent the accelerator roller and cooperating therewith to accelerate the product, and a cleaning unit located below the accelerator roller and including at least one fan for directing a current of air at the product accelerated by the accelerator roller. The substantially vertical wall adjacent the accelerator roller has a rough hull surface.

9 Claims, 4 Drawing Figures

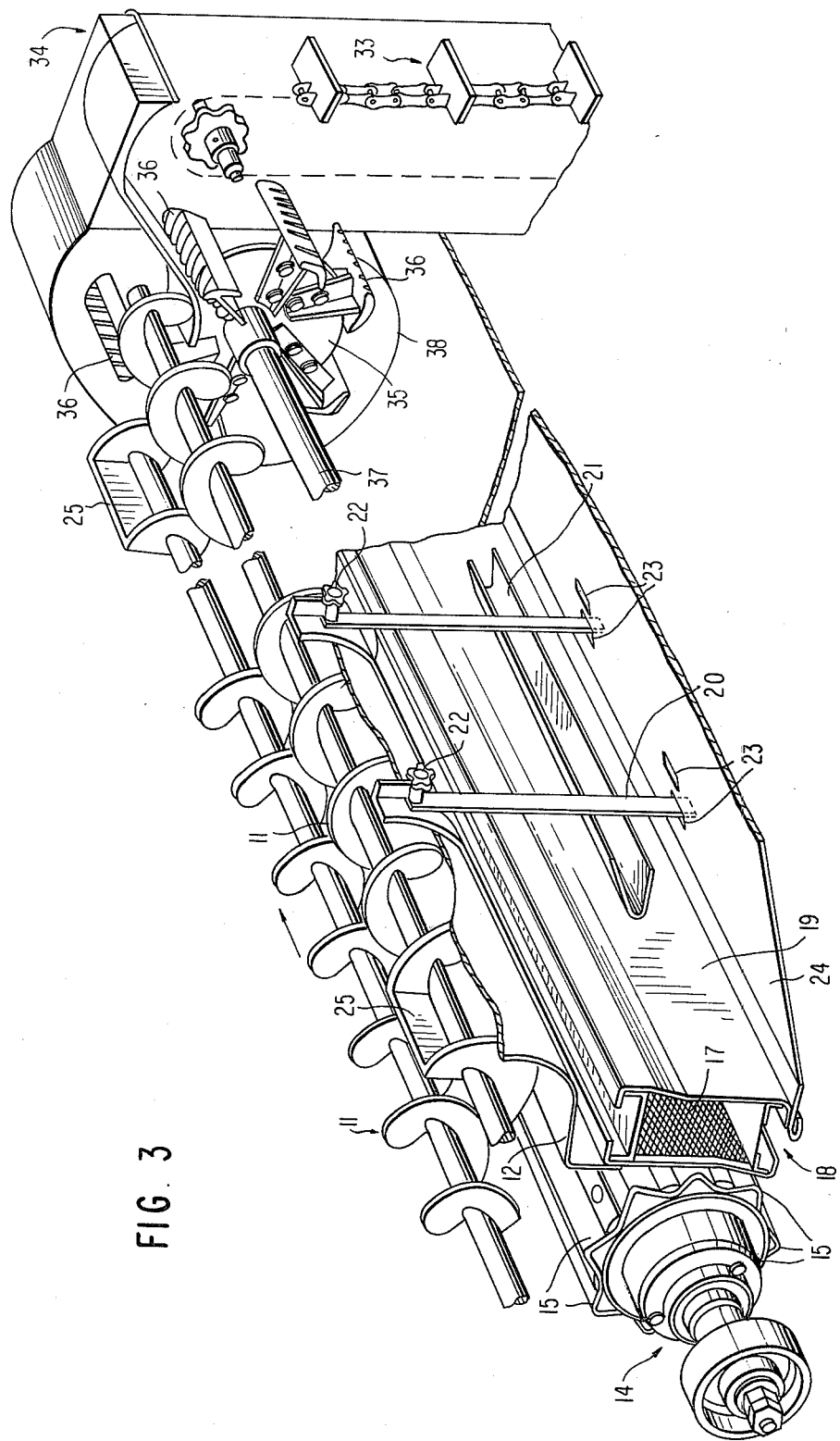

COMBINE HARVESTER

The present invention relates to a combine harvester including:

a threshing unit;

a pair of transverse, contra-rotating distributor augers located downstream of the threshing unit (relative to the direction of flow of the product) and arranged to receive the product leaving the threshing unit and discharge it downwardly for distribution over the entire width of the harvester;

an accelerator roller located below the two distributor augers for accelerating the fall of the product;

a substantially vertical fixed wall adjacent the accelerator roller and cooperating therewith to accelerate the product, and a cleaning unit located below the accelerator roller and including at least one fan for directing a current of air at the product accelerated by the accelerator roller.

A combine harvester of the aforesaid type is described and illustrated in a prior utility model application No. 53321-B/80.

The object of the present invention is to improve the combine harvester which has already been proposed by providing it with a device for hulling the grain, that is, stripping the grain still surrounded by husks.

In order to achieve this object, the invention has as its subject a combine harvester of the aforesaid type, the main characteristic of which lies in the fact that the substantially vertical wall adjacent the accelerator roller has a rough hulling surface facing the accelerator roller.

By virtue of this characteristic, the product leaving the distributor augers and passing between the accelerator roll and the rough wall is subjected to a hulling action.

According to a further characteristic of the present invention, the rough hulling wall is in the form of a mesh and constitutes a longitudinal face of a box element the opposite face of which is constituted by a smooth wall. Moreover, this box element may be fixed to the structure of the harvester so that it can present one or other of these walls equally well to the accelerator roller.

Thus, it is possible to replace the rough wall by the smooth wall simply and rapidly, when the nature of the harvested product does not require a hulling operation.

When the cleaning unit of the combine harvester includes a device for rethreshing the product recovered at the output of the cleaning unit, as already proposed in the utility model application mentioned above, the combine harvester according to the invention is further characterised in that the rethreshing device includes a rethresher drum which is mounted at one end of the shaft of the accelerator roller and is rotatable within a casing. In this case, means are provided for conveying the recovered product from the cleaning unit into the casing. Moreover, this casing includes an opening for discharging the rethreshed product onto one of the two distributor augers, which is thus also used for returning the rethreshed product to the cycle.

In the present description and in the claims which follow, the term "recovered material" is intended to refer to that product which, when it has reached the output of the cleaning unit, requires a further cleaning operation before it can be conveyed to the grain storage tank with which the combine harvester is provided.

According to a further characteristic, the lower wall of the casing of the rethreshing device has axial ribs on its internal surface so as to form a thresher concave cooperating with the rethresher drum.

Further characteristics and advantages of the present invention will emerge from the description which follows with reference to the appended drawings, provided purely by way of non-limiting example, in which:

FIG. 3 is a perspective view of the detail of FIG. 2, and

Figure 1:
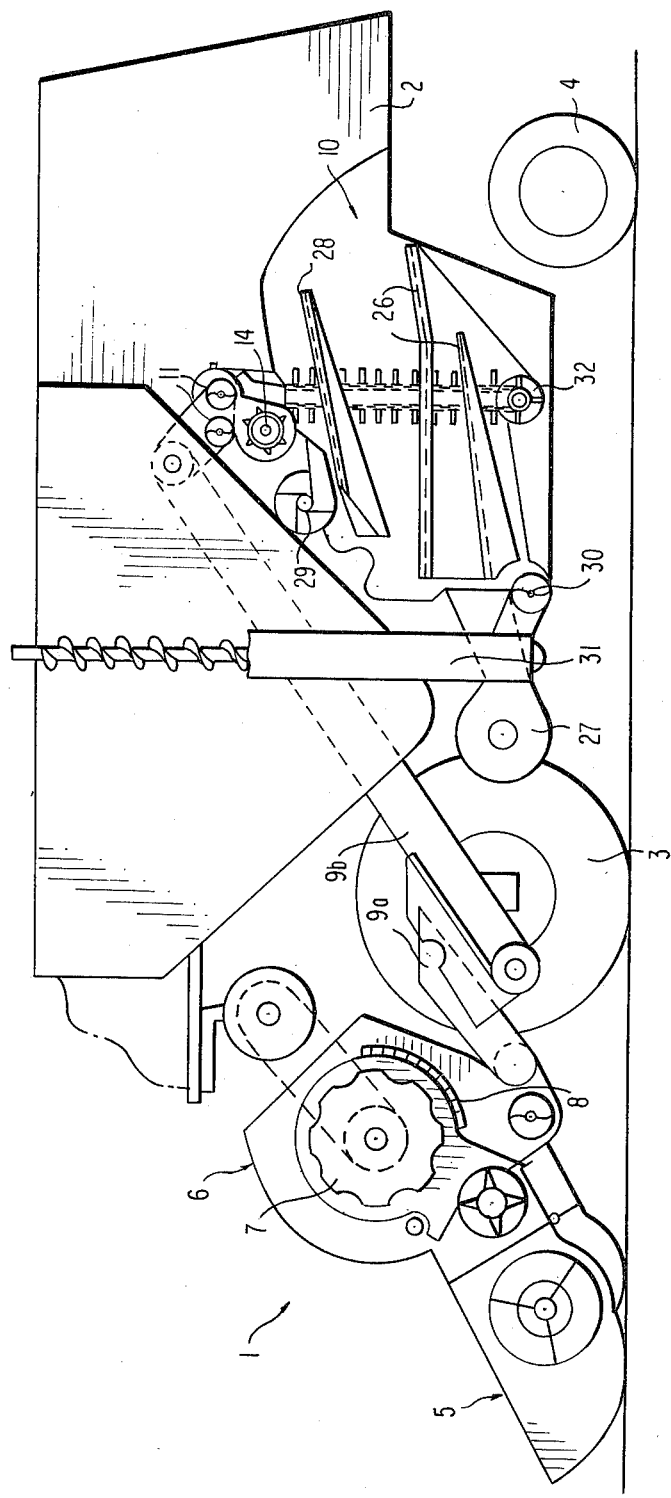
FIG. 1 is a schematic side elevational view of a combine harvester according to the invention.

In FIG. 1, a combine harvester, generally indicated 1, has a fixed structure 2 mounted on front wheels 3 and rear wheels 4. At the front, the combine harvester has a cutting table 5 and a threshing unit 6 including a thresher cylinder 7 and a thresher concave 8.

Two conveyors 9a, 9b arranged in series with each other, convey the product leaving the threshing unit 6 to the cleaning unit of the harvester, which is generally indicated 10.

The general structure of the combine harvester illustrated in FIG. 1 is described in detail in the prior utility model application No. 53321-B/80 by the same Applicants.

Below the discharge end of the conveyor 9b are located two transverse, contra-rotating distributor augers 11 (also see FIGS. 2 and 3).

Figure 2:
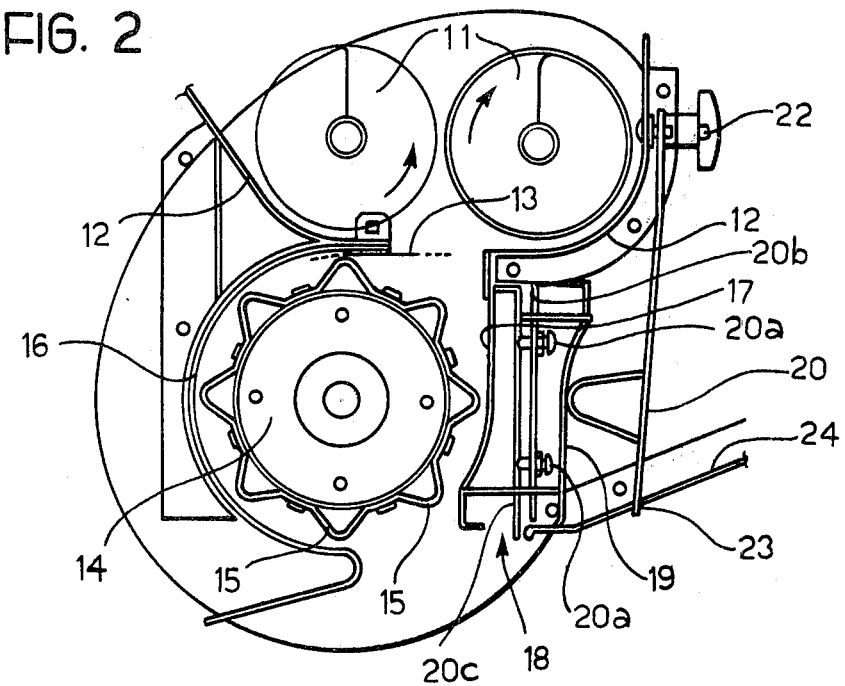
FIG. 2 is a schematic view, on an enlarged scale, of a detail of FIG. 1.

With reference to FIG. 2, the two distributor augers 11 are adjacent two walls 12 which form part of the fixed structure 2 of the harvester and are located below the augers. The facing edges of these two walls 12 are spaced apart so as to define an opening below the two distributor augers 11. The width of this opening may be adjusted by means of a plate 13 which is fixable to the structure of the harvester so that its position is adjustable.

The details of the fixing of the plate 13 to the structure of the harvester is illustrated schematically in the drawings. This fixing may be effected, for example, by means of a bolt arranged to engage in any one of the plurality of holes in the plate 13 or in the structure of the harvester to which the plate 13 is fixed. Clearly, however, any other adjustable fixing means could be used.

With reference to FIG. 3, each of the two distributor augers 11 has a blade 25 at its discharge end, the function of which will be explained below. Since the two distributor augers 11 are arranged to feed the material in opposite directions from each other, the two blades 25 are disposed at opposite ends of the pair of augers 11.

An accelerator roller 14 is rotatably mounted about a transverse axis below the two distributor augers 11 for accelerating the fall of the product distributed by the augers 11, as will be described in detail below.

In the particular embodiment illustrated (see FIG. 3), the accelerator roller is provided peripherally with a series of axial ribs 15 preferably made from rubber.

The accelerator roller 14 is surrounded, on its side facing the front of the harvester, by a wall 16 which forms part of the fixed structure 2 and has a semicircular profile in section.

Adjacent the accelerator roller, on that side of the roller facing the rear part of the harvester, on the other hand, is located a substantially vertical wall 17 for cooperating with the ribs 15 of the accelerator roller to accelerate the fall of the product discharged by the augers 11.

According to the main characteristic of the present invention, the wall 17 is a rough wall, preferably in the form of a mesh (see FIG. 3).

The wall 17 constitutes a longitudinal face of a box element 18 fixed releasably to the fixed structure 2 of the harvester.

As illustrated in FIG. 3, the longitudinal face of the box element 18 opposite the wall 17, shown by the reference numeral 19, is constituted by a smooth wall.

The box element 18 may be fixed to the structure of the harvester equally well in the position illustrated in FIG. 3 and in the reverse position in which the plain wall 19 is adjacent the accelerator roller 14.

Moreover, the distance between the walls 17, 19 and the accelerator roller 14 is adjustable by means of four bearing screws 20a which are engaged in pairs in threaded coupling in two flat elements 20b, each provided at one of the two lateral ends of the box element 18.

A substantially conical end of each screw 20a bears against a corresponding centering recess provided in two holding elements 20c secured to the fixed structure 2 of the harvester.

In the embodiment illustrated, the clamping of the box element 18 in its mounted position is effected by two plates 20 which have their ends connected to the fixed structure of the machine and are provided with a retaining element 21 in contact with the wall of the box element 18 opposite the accelerator roller 14.

The retaining element 21 is constituted by a V-section having two longitudinal edges welded to the plates 20 and the zone corresponding to the vertex of the V in contact with the box element 18.

Each of the plates 20 is fixable to one of the two walls 12 by screw means operable by knobs 22. The end of each plate 20 opposite the knob 22 can be inserted in either of two slots 23 in a wall 24 forming part of the fixed structure of the harvester, on which the box element 18 rests. The engagement of each plate 20 in either slot 23 allows the box element 18 to be clamped to the harvester however it is adjusted.

The cleaning unit 10, as known in itself, includes two superimposed cleaning screens 26 associated with two fans 27 (only one of which is visible in FIG. 1) which are located side-by-side transversely and are arranged to direct a current of air at the product falling onto the screens 26. Above the screens and below the accelerator roller 14 is located an oscillating chute 28 for conveying the product onto the screens 26. Associated with the chute 28 are three fans 29 (only one of the fans 29 being visible in FIG. 1) which are located side-by-side transversely and are arranged to direct a current of air at the product falling into the chute 28.

Below the cleaning screens 26 is located on auger 30 for feeding the cleaned grain to a further screw conveyor 31 for conveying the cleaned grain to the storage tank 32a of the harvester.

Also located below the cleaning screens 26 is a transverse auger 32 for conveying the recovered material to a conveyor device which, in the example illustrated, is in the form of a bladed elevator 33 and is arranged to carry the recovered material to a rethreshing device 34.

In the present description and in the claims which follow, the term "rethreshing device" is intented to refer to a device for subjecting the recovered material from the cleaning unit to a further threshing operation.

The device 34 includes a rethresher drum 35 with blades which carry a plurality of paddles 36. The rethresher drum 35 is mounted at one end of the shaft 37 of the accelerator roller 14. The rethresher drum 35 is also mounted within a casing 38 comprising a lower wall 39 and an upper wall 40. The lower wall 39 has a plurality of ribs 41 on its inner surface (see FIG. 4) for cooperating with the paddles 36 of the rethresher drum 35 to effect the rethreshing of the recovered product.

Figure 4:
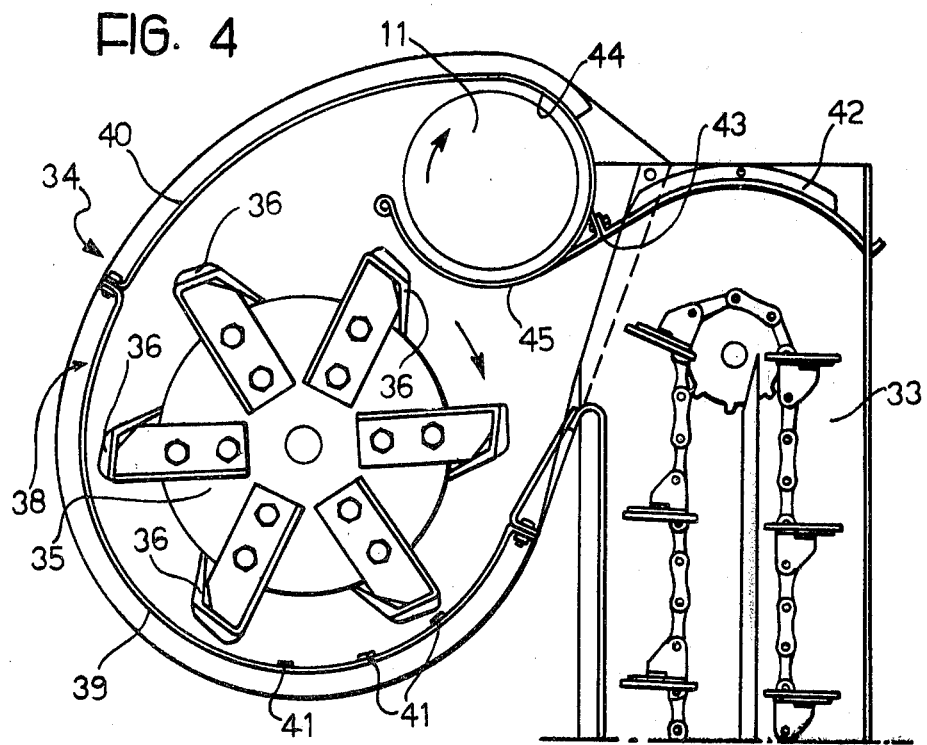
FIG. 4 is a side schematic view of a detail of FIG. 3.

As illustrated in FIG. 4, the bladed elevator 33 is provided with a casing 42 including an upper discharge aperture 43 opening into the casing 38 of the rethreshing device 34.

The upper wall 40 constituting the casing 38 has an evolute profile (see FIG. 4) for allowing the rethreshed product to be conveyed to a discharge opening 44 of the casing 38 located in correspondence with an end of the distributor auger 11 shown on the right in FIGS. 2 and 3.

In the particular embodiment illustrated, the upper part of the discharge opening 44 is defined by the wall 40 and the lower part by a wall 45 fixed to the casing 42 of the bladed elevator 33 (see FIG. 4).

This wall 45 constitutes a concave floor, the lower part of which is adjacent the portion of the distributor auger which receives the rethreshed product.

The operation of the combine harvester described above is as follows.

With reference to FIG. 1, the product harvested by the cutting table 5 is conveyed to the threshing unit 6. The grain and a certain amount of chaff and light material leaving the threshing unit are conveyed by the conveyors 9a, 9b to the cleaning unit 10 of the harvester.

In particular, the product which reaches the discharge end of the conveyor 9b arrives at the two transverse contra-rotating augers 11 and is distributed thereby over the entire width of the harvester. More precisely, the auger 11 which is shown on the left in FIGS. 2 and 3 conveys the product towards its end with the blade 25. When it has reached this end, the blade 25 again transfers the product onto the other distributor auger and the cycle is repeated. The product which reaches the augers 11 is thus made to circulate by these augers in a substantially horizontal plane. During this movement, the product falls progressively through the space (which is adjustable by means of the plate 13) defined between the two facing edges of the adjacent walls 12 below the augers 11, and is uniformly distributed over the entire width of the harvester.

The current of air generated by the fans 29 and directed at the product discharged by the augers 11 causes the lighter material which is to be separated from the grain to be discharged onto the ground. In order to improve the separating action of the fans 29, the fall of the product is accelerated by means of the roller 14 according with the wall 17 or with the wall 19 of the box element 18.

Whenever it is desired to hull the product, the box element 18 is mounted in the position illustrated in the drawings. In this case, the rough mesh 17 is located adjacent the roller 14 and effects hulling of the product which passes between the ribs 15 of this roller and the wall itself.

On the other hand, when the hulling action is not required, the box element 18 is mounted in the position in which the smooth wall 19 is adjacent the roller 14.

The product which is accelerated by the roller 14 and is not discharged onto the ground because of the current of air generated by the fans 29 falls onto the oscillating surface 28 which discharges it onto the cleaning screens 26.

The fans 27 direct a current of air at this product to effect further cleaning.

The cleaned grain which collects below the cleaning screens 26 is transported by means of the screw conveyors 30, 31 to the storage tank 32a of the harvester.

The recovered material collected by the auger 32, on the other hand, is conveyed to the bladed elevator 33 which transports it to the rethreshing device 34.

With reference to FIG. 4, the material which reaches the discharge opening 43 of the bladed elevator 33 passes into the casing 38 at the zone between the lower wall 39 of this casing and the rethreshing drum 35.

The cooperating action of the paddles 36 of the rethresher drum 35 and the ribs 41 on the inner surface of the wall 39 causes the rethreshing of the product. The rethreshed product is conveyed by means of the upper evolute wall 40 towards the discharge opening 44 of the casing 38. The product leaving the opening 44 is discharged onto the distributor auger 11 shown on the right in FIGS. 2 and 3, which makes this product pass through a new cleaning cycle.

As seen from the above description, the structure of the device for rethreshing the recovered product is particularly simple and compact in the combine harvester according to the present invention. The use of an accelerator roller located below the two distributor augers, in fact, allows the drum of the rethreshing device to be attached directly to the shaft of this roller. Moreover, in order to recycle the product leaving the rethreshing device, one of the two distributor augers above the accelerator roller is used.

What is claimed is:

1. A combine harvester including a fixed structure, a threshing unit carried by said fixed structure, a pair of transverse contra-rotating distributor augers rotatably mounted in said fixed structure and located downstream of said threshing unit relative to the product flow direction and arranged to receive the product leaving said threshing unit and discharge it downwardly for distribution over the entire width of the harvester, an accelerator roller rotatably mounted in said fixed structure below said two distributor augers for accelerating the fall of the product, a box element having two opposing longitudinal walls adjustably secured to said fixed structure adjacent said accelerator roller so as to selectively present one of said walls to said accelerator roller to provide a substantially vertical fixed wall adjacent the accelerator roller for cooperation therewith to accelerate the product, and a cleaning unit located below said accelerator roller and including at least one fan for directing a current of air at the product accelerated by said accelerator roller wherein one of said walls of said box element is provided with a rough hulling surface and the other of said walls of said box element is provided with a smooth surface.

2. A combine harvester as defined in claim 1, wherein, for clamping the box element in its mounted position on the structure of the harvester, the harvester further includes at least one pair of plates connected to said structure at their ends, and a retaining member carried by said plates and being in contact with said wall of the box element opposite the accelerator roller.

3. A combine harvester as defined in claim 1, wherein it further includes screws, two flat elements provided at respective lateral ends of the box element, said screws being engaged in said flat elements, and holding elements fixed to the structure of the harvester and defining centering recesses against which the ends of said screws bear.

4. A combine harvester as defined in claim 2, wherein the rough hulling surface of said wall is in the form of a mesh.

5. A combine harvester as defined in claim 2, wherein screw means are provided to fix one end of each said plate to the structure of the harvester, and said structure includes a wall defining slots in which the other end of each plate is engaged.

6. A combine harvester as defined in claim 5, wherein said wall forming part of the structure of the harvester defines at least one pair of said slots in correspondence with said other end of each plate, for allowing the clamping of the box element in different mounted positions.

7. A combine harvester as defined in claim 2, in which the cleaning unit includes a device for rethreshing the recovered product from the cleaning unit, wherein:
said rethreshing device includes a rethreshing drum mounted at one end of the accelerator roller shaft, and a rethreshing casing in which the drum is rotatable;
means are provided for conveying the recovered product from the cleaning unit to the rethreshing casing, and
said casing defines an opening for the discharge of the rethreshed product onto one of said distributor augers.

8. A combine harvester as defined in claim 7, wherein the rethreshing casing includes a lower wall with internal axial ribs for cooperating with the rethreshing drum.

9. A combine harvester as defined in claim 7, wherein the rethreshing casing includes an upper wall with an evolute profile for conveying the rethreshed product to the discharge opening.

* * * * *